(12) United States Patent
North et al.

(10) Patent No.: US 6,848,260 B2
(45) Date of Patent: Feb. 1, 2005

(54) PREMIXED PILOT BURNER FOR A COMBUSTION TURBINE ENGINE

(75) Inventors: David D. North, Palm Beach Gardens, FL (US); Arthur J. Harris, Jr., Orlando, FL (US); Hank Reid, Orlando, FL (US); Jesse Eng, Jupiter, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 122 days.

(21) Appl. No.: 10/252,208

(22) Filed: Sep. 23, 2002

(65) Prior Publication Data

US 2004/0055306 A1 Mar. 25, 2004

(51) Int. Cl.[7] ................................................ F23R 3/32
(52) U.S. Cl. ............................................. 60/737; 60/746
(58) Field of Search ......................... 60/737, 738, 746, 60/752

(56) References Cited

U.S. PATENT DOCUMENTS

| | | |
|---|---|---|
| 4,429,527 A | 2/1984 | Teets |
| 4,701,124 A | 10/1987 | Maghon et al. |
| 4,982,570 A | 1/1991 | Waslo et al. |
| 5,237,812 A | 8/1993 | Mumford |
| 5,359,847 A * | 11/1994 | Pillsbury et al. ............... 60/737 |
| 5,408,825 A * | 4/1995 | Foss et al. ...................... 60/737 |
| 5,450,725 A * | 9/1995 | Takahara et al. ............... 60/737 |
| 5,491,970 A | 2/1996 | Davis, Jr. et al. |
| 5,498,155 A | 3/1996 | Chyou et al. |
| 5,551,228 A | 9/1996 | Mick et al. |
| 5,623,826 A | 4/1997 | Ohtsuka et al. |
| 5,685,139 A | 11/1997 | Mick et al. |
| 5,791,148 A * | 8/1998 | Burrus ........................ 60/752 |
| 5,822,992 A | 10/1998 | Dean |
| 5,836,164 A | 11/1998 | Tsukahara et al. |
| 5,943,866 A | 8/1999 | Lovett et al. |
| 5,983,642 A * | 11/1999 | Parker et al. ................. 60/737 |
| 6,038,861 A | 3/2000 | Amos et al. |
| 6,038,864 A | 3/2000 | Prade et al. |
| 6,047,550 A | 4/2000 | Beebe |
| 6,070,411 A | 6/2000 | Iwai et al. |
| 6,082,111 A | 7/2000 | Stokes |
| 6,192,688 B1 | 2/2001 | Beebe |
| 6,282,904 B1 | 9/2001 | Kraft et al. |
| 6,327,860 B1 | 12/2001 | Critchley |
| 2001/0052229 A1 | 12/2001 | Tuthill et al. |
| 2002/0014078 A1 | 2/2002 | Mandai et al. |

FOREIGN PATENT DOCUMENTS

| | | |
|---|---|---|
| EP | 0 488 556 | 6/1992 |
| JP | 411344224 A | 12/1999 |
| WO | WO 98/25084 | 6/1998 |
| WO | WO 99/04196 | 1/1999 |

* cited by examiner

Primary Examiner—Michael Koczo (57) ABSTRACT

A combustor (40) for a gas turbine engine is provided with a premix pilot fuel stage (42) in order to reduce the emission of oxides of nitrogen from the engine. An in-service engine may be modified to add the premix pilot fuel stage by delivering premix pilot fuel to a ring manifold (42) for tip-feeding a premix pilot fuel outlet member such as a swirler vane (78) or fuel peg (124). In this manner, complex and expensive components such as the top hat (46), support housing (48) and diffusion pilot burner assembly (44) may be used without modification. Thermal stresses caused by the differential cooling of the ring manifold by the premix pilot fuel (96) are reduced by a heat shield (94) installed within the manifold.

23 Claims, 6 Drawing Sheets

PREMIXED PILOT BURNER FOR A COMBUSTION TURBINE ENGINE

FIELD OF THE INVENTION

This invention relates to the field of gas turbine engines.

BACKGROUND OF THE INVENTION

Gas turbine engines are known to include a compressor for compressing air; a combustor for producing a hot gas by burning fuel in the presence of the compressed air produced by the compressor, and a turbine for expanding the hot gas to extract shaft power. Diffusion flames burning at or near stoichiometric conditions with flame temperatures exceeding 3,000° F. dominate the combustion process in many older gas turbine engines. Such combustion will produce a high level of oxides of nitrogen (NOx). Current emissions regulations have greatly reduced the allowable levels of NOx emissions. Lean premixed combustion has been developed to reduce the peak flame temperatures and to correspondingly reduce the production of NOx in gas turbine engines. In a premixed combustion process, fuel and air are premixed in a premixing section of the combustor. The fuel-air mixture is then introduced into a combustion chamber where it is burned.

The design of a gas turbine combustor is complicated by the necessity for the gas turbine engine to operate reliably with a low level of emissions at a variety of power levels. High power operation at high firing temperatures tends to increase the generation of oxides of nitrogen. Low power operation at lower combustion temperatures tends to increase the generation of carbon monoxide and unburned hydrocarbons due to incomplete combustion of the fuel. Under all operating conditions, it is important to ensure the stability of the flame to avoid unexpected flameout, damaging levels of acoustic vibration, and damaging flashback of the flame from the combustion chamber into the fuel premix section of the combustor. A relatively rich fuel/air mixture will improve the stability of the combustion process but will have an adverse affect on the level of emissions. A careful balance must be achieved among these various constraints in order to provide a reliable machine capable of satisfying very strict modern emissions regulations.

Staging is the delivery of fuel to the combustion chamber through at least two separately controllable fuel supply systems or stages including separate fuel nozzles or sets of fuel nozzles. As the power level of the machine is increased, the amount of fuel supplied through respective stages is increased to achieve a desired power level. Multiple fuel stages provide flexibility in the operation of a gas turbine engine, since the relative fuel flow rate through the various stages may be controlled to achieve a desired set of combustion conditions in the combustion chamber. For example, a Model 501F gas turbine engine supplied by the assignee of the present invention includes two main fuel premix stages, a diffusion pilot stage, and a C stage that premixes a small amount of fuel into the compressed air upstream of all of the other stages. Such a multi-stage system provides a high degree of control to the plant operator for ensuring stable operation with minimized emissions under a broad range of operating conditions.

Figure 1:
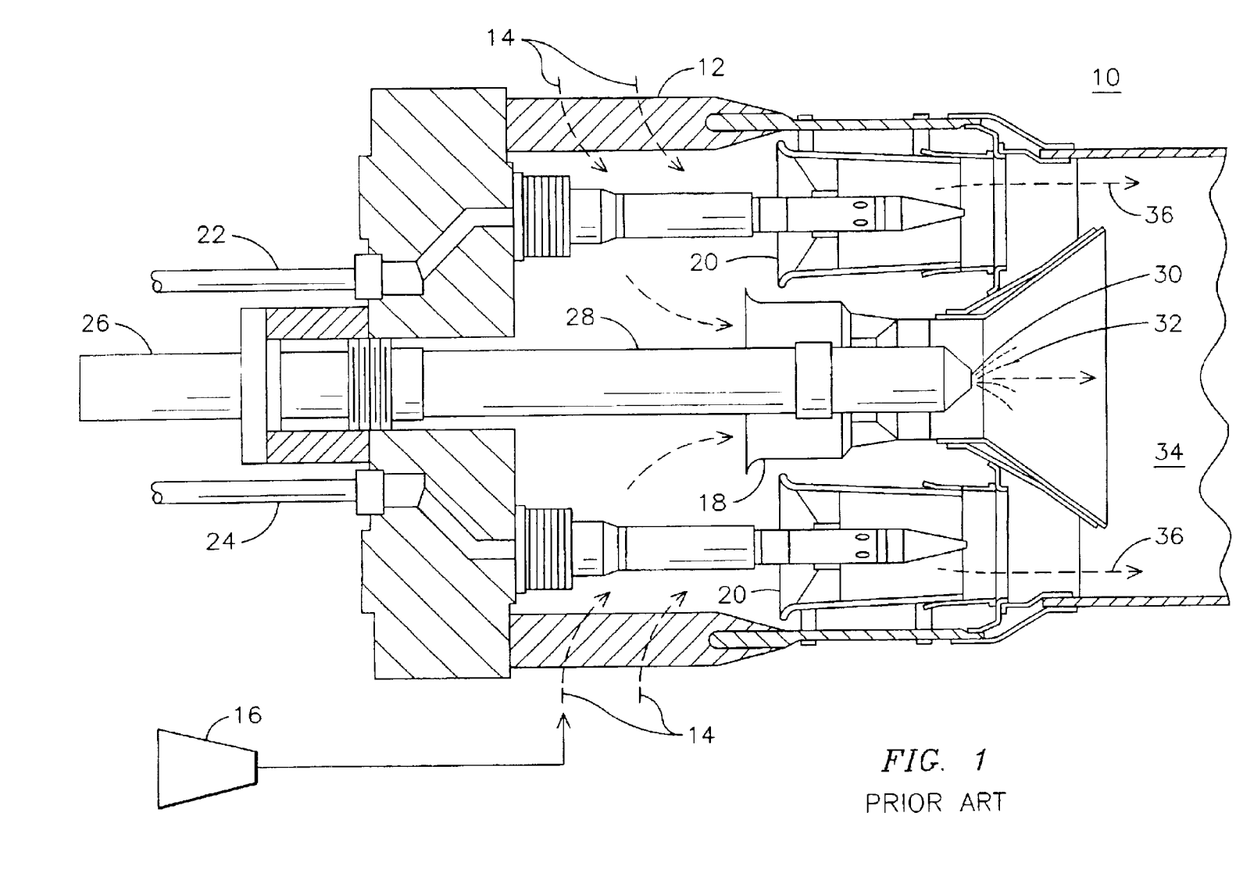
FIG. 1 is a partial cross-sectional view of a prior art combustor having a diffusion pilot burner.

FIG. 1 illustrates a portion of a prior art can annular combustor 10 of the general type described in U.S. Pat. No. 6,082,111. A combustor basket 12 contains openings for receiving a flow of combustion air 14 from a compressor 16. The air 14 is directed through either a diffusion pilot burner assembly 18 or one of eight premix main fuel burner assemblies 20 (also called rockets) disposed in a ring around the diffusion pilot burner 18. Alternate ones of the main fuel burner assemblies 20 may be grouped into separate stages, for example an A-stage that is provided with a combustible fuel through A-stage fuel supply line 22 and a B-stage that is provided with a separately controllable combustible fuel through B-stage fuel supply line 24. A diffusion pilot fuel supply 26 provides a flow of a combustible fuel to diffusion pilot nozzle 28 having an outlet 30 for delivering diffusion pilot fuel 32 to combustion chamber 34. The pilot diffusion flame provides stability for the combustion of the mixture 36 of main fuel and air that is provided to the combustion chamber 34 by the premix main burner assemblies 20.

Increasingly strict environmental regulations continue to reduce the acceptable level of emissions produced by a gas turbine power plant. For example, while many in-service engines were originally designed to produce no more than about 25 ppm of nitrous oxides, new regulations in many regions now limit the production of NOx to less than 15 ppm or even less than 9 ppm. Thus continued improvements in gas turbine combustor design are needed. Furthermore, an economical manner of reducing the emissions from an existing fleet of gas turbine engines is needed.

SUMMARY OF THE INVENTION

A combustor for a gas turbine engine is described herein as including: a combustor basket having a central axis; a diffusion pilot nozzle disposed along the central axis within the combustor basket for delivering a diffusion pilot fuel to a combustion chamber; a main fuel premixer section circumferentially disposed about the central axis radially outward of the diffusion pilot nozzle for delivering a premixed main fuel and air mixture to the combustion chamber; a premix pilot fuel manifold disposed radially inward of the main fuel premixer section and radially outward of the diffusion pilot nozzle; and a pilot fuel premixer section radially disposed radially outward of the diffusion pilot nozzle and in fluid communication with the premix pilot fuel manifold to receive a premix pilot fuel for delivering a mixture of the premix pilot fuel and air to the combustion chamber. A heat shield may be disposed within the premix pilot fuel manifold for thermally insulating the manifold from the premix pilot fuel. The main fuel premixer section may include a plurality of main swirlers circumferentially disposed about the central axis, and the combustor may further include a support member connected between the pilot fuel premixer section and the combustor basket and disposed between respective ones of the main swirlers. The the pilot fuel premixer section may include a plurality of tip fed swirler vanes or tip fed fuel pegs having respective fuel passages receiving the premix pilot fuel from the premix pilot fuel manifold and having respective fuel outlets. The premix pilot fuel manifold may be a ring manifold disposed about the central axis. The pilot fuel premixer section may include a hub surrounding the diffusion pilot nozzle, and the premix pilot fuel manifold may be being axially remote from the hub, or the premix pilot fuel manifold may be separated from the hub by a gap for accommodating differential thermal growth there between.

A kit for installing a premix pilot fuel stage into a gas turbine combustor having a main fuel premixer stage radially disposed around a diffusion pilot nozzle is described herein as including: a manifold for receiving premix pilot fuel; and a premix pilot fuel outlet member for fluid communication with the manifold and extending radially inwardly from the manifold for delivering the premix pilot fuel into a flow of air passing through the gas turbine combustor; and wherein the manifold and the premix pilot fuel outlet member are sized for installation between the main fuel premixer stage and the diffusion pilot nozzle.

BRIEF DESCRIPTION OF THE DRAWINGS

The invention will be more apparent from the following description in view of the drawings that show.

DETAILED DESCRIPTION OF THE INVENTION

The pilot diffusion flame dominates the production of oxides of nitrogen in combustors of the type illustrated in FIG. 1. For example, while consuming only approximately 10% of the fuel used by combustor 10, the diffusion pilot burner assembly 18 may produce more than half of the total NOx generated by the combustor 10. The present inventors have found that the addition of a premix pilot fuel stage to such a combustor not only provides an additional degree of control over the combustion process, but it also provides a significant reduction in the production of oxides of nitrogen.

Figure 2:
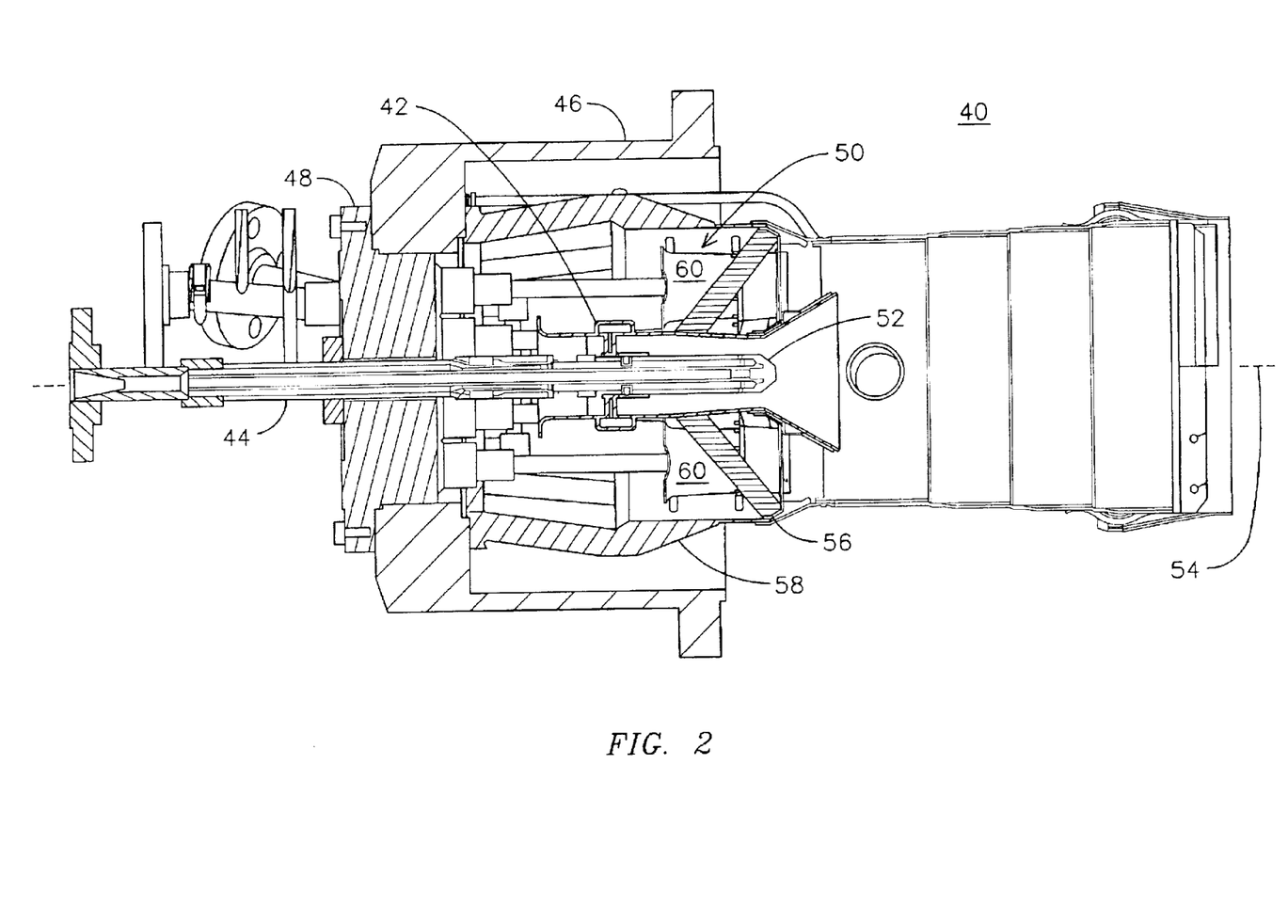
FIG. 2 is a partial cross-sectional view of a combustor having a premix pilot fuel stage.

FIG. 2 illustrates a partial cross-sectional view of a combustor 40 that is capable of improved performance when compared to the type of prior art combustor illustrated in FIG. 1. In particular, combustor 40 includes a premixed pilot fuel stage 42 that allows the amount of fuel delivered to the diffusion pilot burner assembly 44 to be reduced when compared to a similar combustor not having such a premixed pilot fuel stage. Advantageously, the premixed pilot fuel stage 42 is designed so that it may be installed as a backfit into an existing combustor in order to facilitate the reduction of undesirable emissions in an in-service gas turbine engine.

The combustor 40 of FIG. 2 is illustrated as a modified version of a Model 501F dry low NOx (DLN) gas turbine combustor. Many of the components of combustor 40 may be formed to be identical to those of a Model 501F combustor, thereby facilitating the use of the present invention as a backfit. In the embodiment of FIG. 2, the diffusion pilot burner assembly 44, the combustor top hat 46, the support housing 48, and the main fuel premixer section 50 may be identical to those provided with a prior art Model 501F gas turbine engine or may be used with only minor modifications. The new premix pilot fuel stage 42 is designed to fit radially outwardly from the diffusion pilot nozzle 52 that is disposed along a central axis 54 of the combustor 40 and generally radially inwardly from the main fuel premixer section 50. A support member 56 may extend radially outwardly to make contact with combustor basket 58 for supporting the premix pilot fuel stage 42 within the combustor 40. The support member 56 is illustrated in the embodiment of FIG. 2 as a plurality of struts extending between respective ones of the main fuel premix burner assemblies 60.

Figure 3:
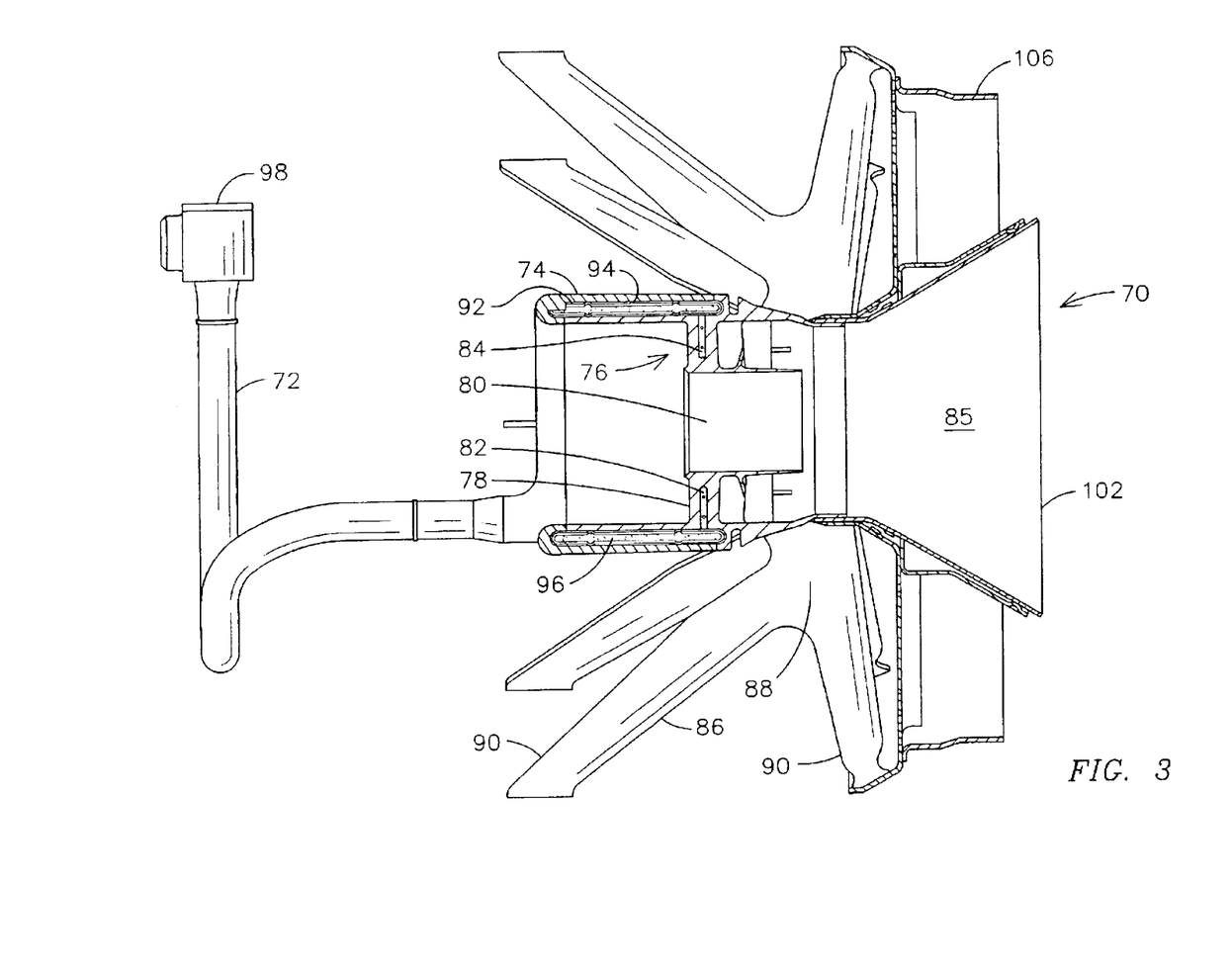
FIG. 3 is a partial cross-sectional view of the pilot fuel premixer section of the combustor of FIG. 2.

FIG. 3 illustrates a further embodiment of a pilot fuel premixer section 70 of a combustor that may be used to modify an existing Model 501F gas turbine engine to achieve lower NOx emissions. A fuel tube 72 is used to provide a flow of premix pilot fuel to a manifold such as ring manifold 74. The ring manifold 74 is in fluid communication with a premix pilot swirler 76 having a plurality of mixing vanes 78 disposed about a central annulus 80 sized to receive the diffusion pilot nozzle of an existing burner (not shown in FIG. 3). The vanes 78 contain internal fuel passages 82 having respective outlets 84 for delivering a flow of premix pilot fuel into a flow of combustion air passing over the vanes 78 for delivering a mixture of the premix pilot fuel and air to a downstream combustion chamber 85. In the embodiment of FIG. 3 the ring manifold extends completely around a central axis of the combustor and provides fuel to all of the outlets 84. One skilled in the art may appreciate that in other embodiments a manifold having a shape other than a ring may be used, and a manifold may provide fuel to a subset of the total number of outlets 84. For example, a spider manifold (not shown) may be used having individual fingers extending in an axial direction from an upstream position to provide fuel to respective individual ones of the fuel outlets 84. The pilot fuel premixer section 70 is supported within a combustor basket (not shown) by a plurality of support members 86 each formed in a generally V-shape having a central portion 88 connected to the pilot fuel premixer section 70 and opposed end portions 90 connected either directly or indirectly to the combustor basket (not shown). The support members 86 are sized to fit in existing spaces found between adjacent main fuel premix burner swirlers (not shown).

A gas turbine combustor will operate at extremely high temperatures and will experience rapid temperature changes. The materials of construction of pilot fuel premixer section 70 and support members 86 may be selected from known high temperature stainless steel alloys. Differential thermal growth must be considered for such components in order to ensure that thermal stresses remain below allowable limits. Of particular concern would be differential thermal growth between the ring manifold 74 that is cooled by the flow of premix pilot fuel and surrounding portions that are not so cooled. The present inventors have found that thermal stresses may be reduced in pilot fuel premixer section 70 by thermally insulating the ring manifold 74 from the fuel contained therein. This is accomplished in part in the embodiment of FIG. 3 by a heat shield 92 that creates a relatively stagnant region of fuel 94 that acts as an insulator between the ring manifold 74 and the fuel 96 contained therein.

Figure 4:
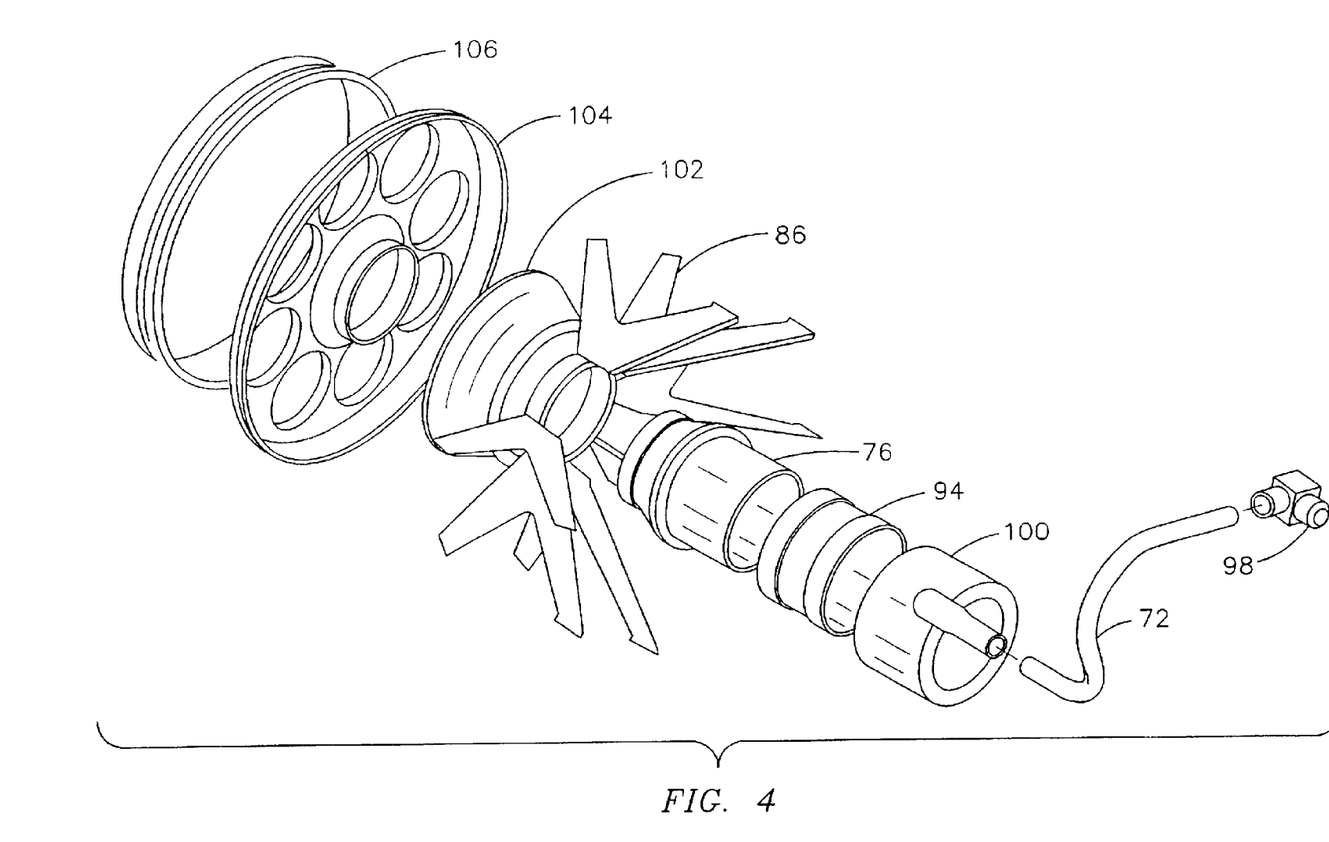
FIG. 4 is an exploded view of portions of the combustor of FIGS. 2 and 3.

FIG. 4 is an exploded view of the assembly of FIG. 3 illustrating additional details of the design. Fuel tube 72 is attached to a 90° fitting for interface with a pilot fuel feed pipe (not shown) that passes through and is sealed into the gas turbine engine atmospheric pressure boundary. Ring manifold 74 may be formed as an integral unit or it may include a manifold cover 100 adapted to fit around an outside diameter surface of swirler 76. Heat shield 92 has a generally cylindrical shape for fitting within the ring manifold 74. The swirler 76 has an outlet end fitting into an inlet end of a diffusion cone 102. A plurality of support members 86 are disposed around the joint between the swirler 76 and the diffusion cone 102 for providing mechanical support. An existing base plate 104 including eight openings for receiving the main fuel swirlers (not shown) may be used. An outer ring 106 completes the assembly. FIG. 4 also omits the diffusion pilot nozzle assembly that is inserted through the central opening defined by the swirler 76 and diffusion cone 102.

Figure 5:
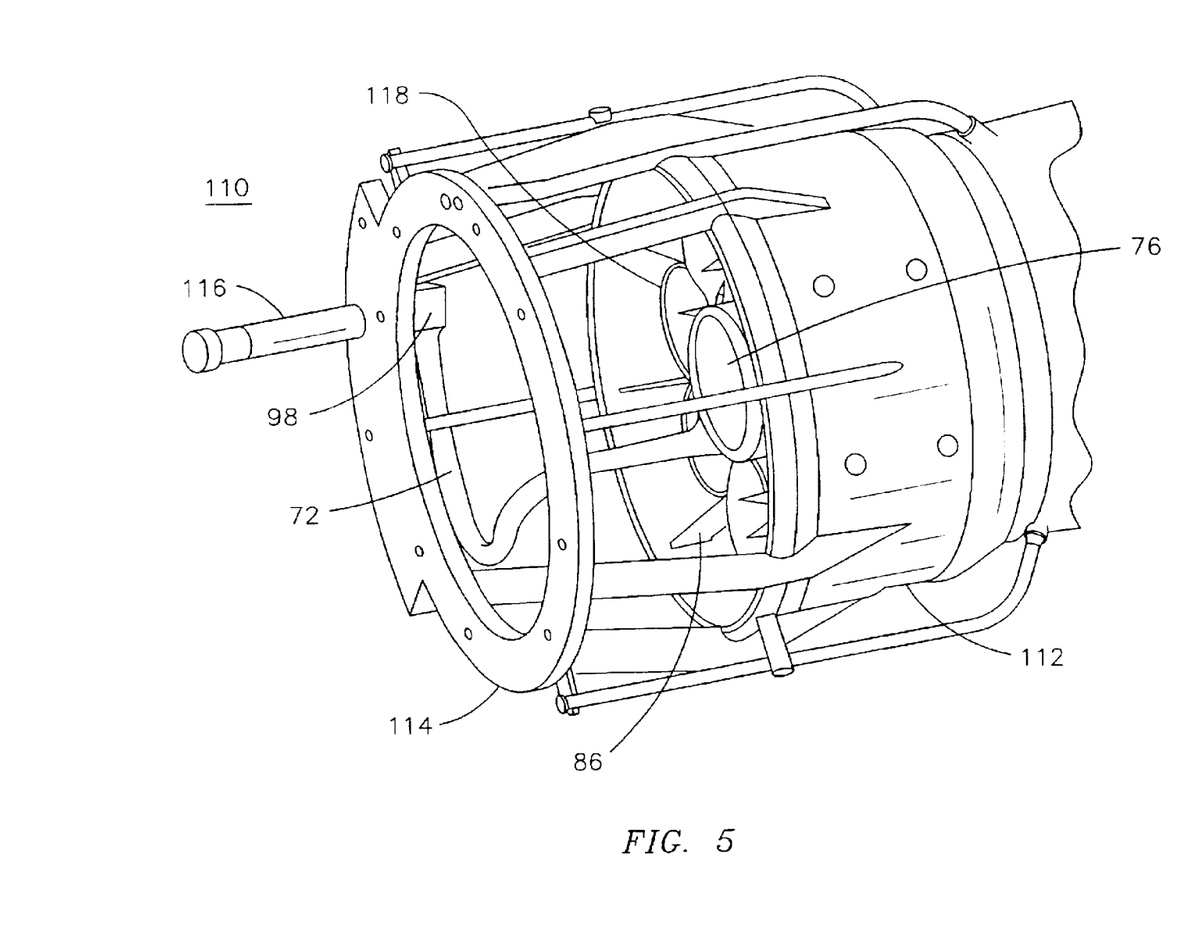
FIG. 5 is an isometric view of portions of the combustor of FIGS. 2 and 3.

FIG. 5 is an isometric view of the assembled components of FIGS. 3 and 4, again having the central diffusion pilot fuel stage removed. These components may be grouped as a kit 110 for installation into an existing can annular combustor of an in-service gas turbine engine. The kit may include a new combustor basket 112 having a flange 114 that may be attached to the existing top hat (not shown) of an in-service engine. The kit 110 also includes a pilot fuel feed pipe 116 connected to the 90° elbow 98 and sealed to the flange 114. Pilot fuel feed pipe 116 extends through a new hole that is drilled through a mating portion of the existing combustor top hat (not shown). Portions of the eight existing main fuel swirlers 118 can be seen surrounding the kit's new pilot swirler 76. The back fitting of a can annular combustor with such a kit 110 avoids the need for modification or replacement of the complex and expensive support housing. Furthermore, by delivering premix pilot fuel 96 to a premix pilot fuel outlet member such as premix pilot swirler 76 from a surrounding manifold, e.g. a tip fed swirler vane 78, it is possible to utilize an existing diffusion pilot burner assembly 18 without modification. In addition, thermal stresses that may otherwise be unacceptably high are maintained within acceptable levels by thermally insulating the surrounding ring manifold 74 from the fuel 96 contained therein.

One skilled in the art may appreciate that a kit for modifying an in-service gas turbine engine to add a premix pilot fuel stage may include the components described above, or fewer or more components needed to accomplish such a modification, depending upon the requirements of the particular engine and the constraints of the particular upgrade project. In some instances it may be desired to provide a kit with individual components, and in other instances it may be desired to provide a kit with preassembled subassemblies. In order to simplify a field modification project, it may be desired to include certain components in a kit as part of a subassembly even though identical components from the existing engine could otherwise be reused with additional field assembly effort. It should also be appreciated that the concepts described herein for improving the performance of a combustor design may be applied to a newly constructed gas turbine engine as well as to an in-service unit.

Figure 6:
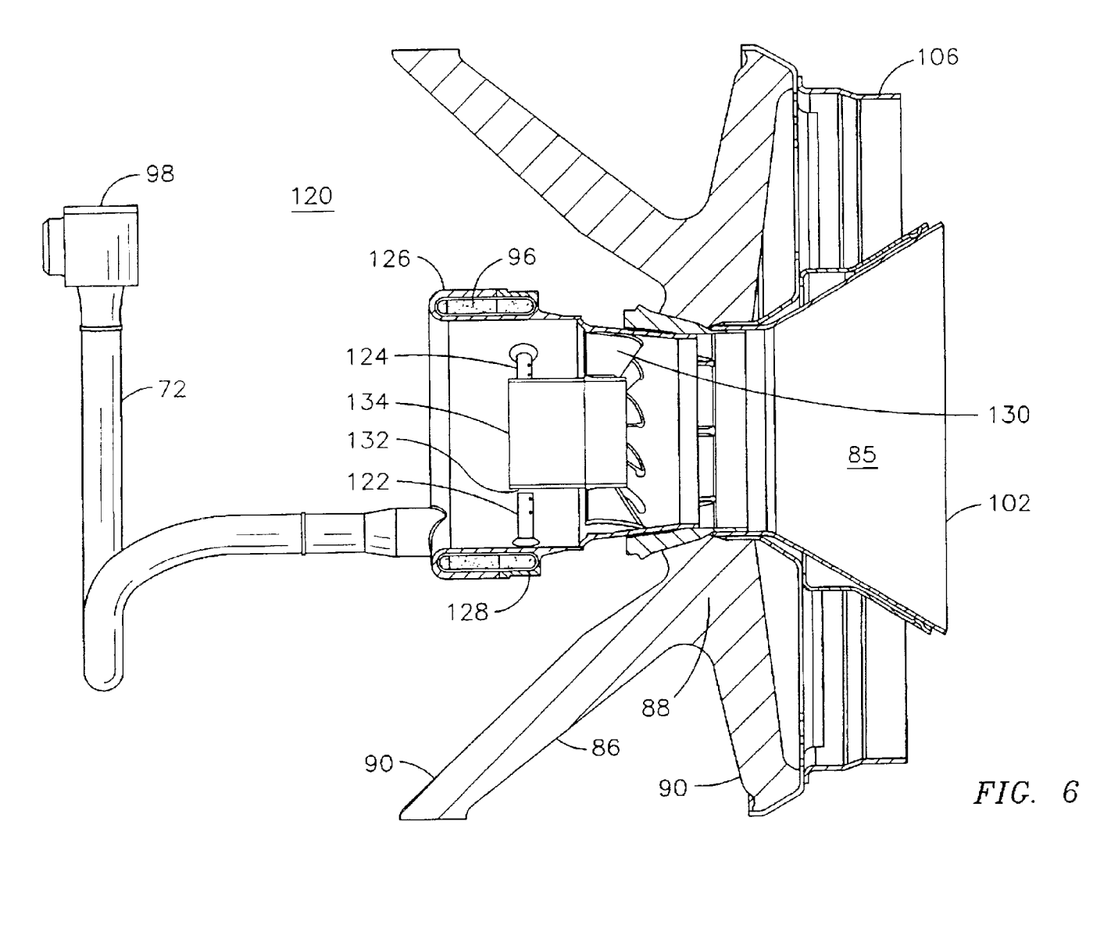
FIG. 6 is a partial cross-sectional view of a further embodiment of a combustor having a premix pilot fuel stage.

FIG. 6 illustrates another embodiment of a can annular combustor premix pilot fuel stage assembly 120 that may be used in new equipment or as a back fit into an in-service gas turbine engine. In this embodiment, the premix pilot fuel outlet member takes the form of a plurality of fuel pegs 122 having respective outlet openings 124 in fluid communication with a premix pilot fuel ring manifold 126. Furthermore, the manifold 126 of FIG. 6 may be thermally isolated from the fuel 96 contained within by a coating of an insulating material, such as a ceramic thermal barrier coating material 128, applied by known methods to the inside surface of the manifold 126. The integrity of coating material 128 is important in this embodiment since the fuel outlet openings 124 are small and would be easily clogged in the event of the release of the coating material 128 from the surface of the manifold 126. Note that the shape of the fuel manifold 126 is selected not only to fit into the existing space envelope of an in-service combustor, but also to minimize the rate of flow of fuel through the manifold, within available space constraints, in order to further minimize the amount of cooling provided to the manifold 126. In general, it is desired to maintain the manifold 126 at as high a temperature as possible in order to minimize the differential temperature between the manifold and the surrounding structural components. In this embodiment, a flow mixing swirler 130 is located downstream of the fuel pegs 122 to provide the required mixing of the pilot fuel 96 and combustion air passing through the assembly 120.

Note that the embodiment of FIG. 6 places the manifold 126 in an axial position that is remote from the axial position of swirler 130. Furthermore, there is a gap 132 between the fuel pegs 122 and a hub 134 surrounding the diffusion fuel nozzle (not shown). This gap 132 is sized to accommodate differential thermal growth between the relatively cool manifold 126 and the relatively hot hub 134. Depending upon the temperatures involved, the size of gap 132 and the materials of construction of a particular application, it may not be necessary to thermally insulate manifold 126 with coating 128 or other means of thermal insulation.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A combustor for a gas turbine engine comprising:

a combustor basket having a central axis;

a diffusion pilot nozzle disposed along the central axis within the combustor basket for delivering a diffusion pilot fuel to a combustion chamber;

a main fuel premixer section circumferentially disposed about the central axis radially outward of the diffusion pilot nozzle for delivering a premixed main fuel and air mixture to the combustion chamber;

a premix pilot fuel manifold disposed radially inward of the main fuel premixer section and radially outward of the diffusion pilot nozzle; and a pilot fuel premixer section radially disposed radially outward of the diffusion pilot nozzle and in fluid communication with the premix pilot fuel manifold to receive a premix pilot fuel for delivering a mixture of the premix pilot fuel and air to the combustion chamber;

wherein the pilot fuel premixer section comprises a plurality of tip fed swirler vanes having respective fuel passages receiving the premix pilot fuel from the premix pilaf fuel manifold and having respective fuel outlets.

2. The combustor of claim 1, further comprising a heat shield disposed within the premix pilot fuel manifold for thermally insulating the manifold from the premix pilot fuel.

3. The combustor of claim 1, further comprising a layer of a thermally insulating material disposed on an inside surface of the premix pilot fuel manifold for thermally insulating the manifold from the premix pilot fuel.

4. The combustor of claim 1, further comprising a means for thermally insulating the premix pilot fuel manifold from the premix pilot fuel contained therein.

5. The combustor of claim 1, wherein the main fuel premixer section comprises a plurality of main swirlers circumferentially disposed about the central axis, the combustor further comprising a support member connected between the pilot fuel premixer section and the combustor basket and disposed between respective ones of the main swirlers.

6. The combustor of claim 1, further comprising a means for supporting the pilot fuel premixer section from the combustor basket.

7. The combustor of claim 1, further comprising a means for supporting the pilot fuel premixer section and the premix pilot fuel manifold from the combustor basket.

8. The combustor of claim 1, wherein the premix pilot fuel manifold comprises a ring manifold disposed about the central axis.

9. The combustor of claim 1, wherein the pilot fuel premixer section comprises a hub surrounding the diffusion pilot nozzle and further comprising the premix pilot fuel manifold being axially remote from the hub.

10. The combustor of claim 1, wherein the pilot fuel premixer section comprises a hub surrounding the diffusion pilot nozzle, and further comprising the premix pilot fuel manifold being separated from the hub by a gap for accommodating differential thermal growth there between.

11. The combustor of claim 1, wherein the pilot fuel premixer section comprises a premix pilot fuel outlet member in fluid communication with the premix pilot fuel manifold and extending radially inwardly from the manifold.

12. A combustor for a gas turbine engine comprising:
a combustor basket having a central axis;
a diffusion pilot nozzle disposed along the central axis within the combustor basket for delivering a diffusion pilot fuel to a combustion chamber;
a main fuel premixer section circumferentially disposed about the central axis radially outward of the diffusion pilot nozzle for delivering a premixed main fuel and air mixture to the combustion chamber;
a premix pilot fuel manifold disposed radially inward of the main fuel premixer section and radially outward of the diffusion pilot nozzle; and
a pilot fuel premixer section radially disposed radially outward of the diffusion pilot nozzle and in fluid communication with the premix pilot fuel manifold to receive a premix pilot fuel for delivering a mixture of the premix pilot fuel and air to the combustion chamber;
wherein the main fuel premixer section comprises a plurality of main swirlers circumferentially disposed about the central axis, the combustor further comprising a support member connected between the pilot fuel premixer section and the combustor basket and disposed between respective ones of the main swirlers; and
wherein the support member comprises a general V-shape having a central portion connected to the pilot fuel premixer section and opposed end portions connect to the combustor basket.

13. A combustor for a gas turbine engine
a combustor basket having a central axis;
a diffusion pilot nozzle disposed along the central axis within the combustor basket for delivering a diffusion pilot fuel to a combustion chamber;
a main fuel premixer section circumferentially disposed about the central axis radially outward of the diffusion pilot nozzle for delivering a premixed main fuel and air mixture to the combustion chamber;
a premix pilot fuel manifold disposed radially inward of the main fuel premixer section and radially outward of the diffusion pilot nozzle; and
a pilot fuel premixer section radially disposed radially outward of the diffusion pilot nozzle and in fluid communication with the premix pilot fuel manifold to receive a premix pilot fuel for delivering a mixture of the premix pilot fuel and air to the combustion chamber,
wherein the pilot fuel premixer section comprises a premix pilot fuel outlet member in fluid communication with the premix pilot fuel manifold and extending radially inwardly from the manifold; further comprising:
the premix pilot fuel outlet member comprises a fuel peg;
the pilot fuel premixer section comprises a hub surrounding the diffusion pilot nozzle; and
a gap separating the fuel peg from the hub to accommodate differential thermal growth there between.

14. The combustor of claim 13, wherein the pilot fuel premixer section comprises a swirler disposed in a position axially remote from an axial position of the premix pilot fuel manifold.

15. A kit for installing a premix pilot fuel stage into a gas turbine combustor having a main fuel premixer stage radially disposed around a diffusion pilot nozzle, the kit comprising:
a manifold for receiving premix pilot fuel; and
a premix pilot fuel outlet member for fluid communication with the manifold and extending radially inwardly from the manifold for delivering the premix pilot fuel into a flaw of air passing through the gas turbine combustor; and
wherein the manifold and the premix pilot fuel outlet member are sized for installation between the main fuel premixer stage and the diffusion pilot nozzles wherein the main fuel premixer stage comprises a plurality of main swirlers circumferentially disposed about the diffusion pilot nozzle, the kit further comprising a support member adapted for placement between respective ones of the main swirlers for supporting the ring manifold and premix pilot fuel outlet member from a combustor basket of the gas turbine combustor.

16. The kit of claim 15, wherein the premix pilot fuel outlet member further comprises a fuel peg in fluid communication with the manifold.

17. The kit of claim 15, further comprising a support member for securing the manifold and premix pilot fuel outlet member to a combustor basket of the gas turbine combustor.

18. The kit of claim 15, further comprising a heat shield disposed within the manifold for thermally insulating the manifold from the premix pilot fuel.

19. The kit of claim 15, further comprising a layer of a thermally insulating material disposed on an inside surface of the manifold for thermally insulating the manifold from the premix pilot fuel.

20. The kit of claim 15, further comprising a means for thermally insulating the manifold from the premix pilot fuel contained within the manifold.

21. The kit of claim 15, further comprising a means for supporting the manifold and the pilot fuel outlet member from a combustor basket of the gas turbine combustor.

22. The kit of claim 15, wherein the manifold comprises a ring manifold.

23. A kit for installing a premix pilot fuel stage into a gas turbine combustor having a main fuel premixer stage radially disposed around a diffusion pilot nozzle, the kit comprising:
a manifold for receiving premix pilot fuel; and
a premix pilot fuel outlet member for fluid communication with the manifold and extending radially inwardly from the manifold for delivering the premix pilot fuel into a flaw of air passing through the gas turbine combustor; and
wherein the manifold and the premix pilot fuel outlet member are sized for installation between the main fuel premixer stage and the diffusion pilot nozzles
wherein the premix pilot fuel outlet member further comprises a flow mixing vane in fluid communication with the manifold.

* * * * *